(12) United States Patent
Park et al.

(10) Patent No.: US 11,829,224 B2
(45) Date of Patent: Nov. 28, 2023

(54) METHOD OF OPERATING MEMORY DEVICE AND MEMORY DEVICE PERFORMING THE SAME

(71) Applicant: SAMSUNG ELECTRONICS CO., LTD., Suwon-si (KR)

(72) Inventors: Dongyeon Park, Daegu (KR); Youngjae Park, Suwon-si (KR); Hyungjin Kim, Uiwang-si (KR); Reum Oh, Hwaseong-si (KR); Jinyong Choi, Seoul (KR)

(73) Assignee: Samsung Electronics Co., Ltd.

( * ) Notice: Subject to any disclaimer, the term of this patent is extended or adjusted under 35 U.S.C. 154(b) by 0 days.

(21) Appl. No.: 17/742,175

(22) Filed: May 11, 2022

(65) Prior Publication Data

US 2023/0064572 A1    Mar. 2, 2023

(30) Foreign Application Priority Data

Sep. 1, 2021   (KR) .................. 10-2021-0116346

(51) Int. Cl.
| | | |
|---|---|---|
| *G06F 1/00* | (2006.01) | |
| *G06F 1/3225* | (2019.01) | |
| *G06F 1/3296* | (2019.01) | |
| *G06F 1/3234* | (2019.01) | |
| *G06F 1/3203* | (2019.01) | |

(52) U.S. Cl.
CPC .......... *G06F 1/3225* (2013.01); *G06F 1/3275* (2013.01); *G06F 1/3296* (2013.01); *G06F 1/3203* (2013.01)

(58) Field of Classification Search
CPC ..... G06F 1/3225; G06F 1/3275; G06F 1/3296
USPC .......................................................... 713/323
See application file for complete search history.

(56) References Cited

U.S. PATENT DOCUMENTS

| | | | |
|---|---|---|---|
| 6,510,096 B2 | 1/2003 | Choi et al. | |
| 6,560,158 B2 | 5/2003 | Choi et al. | |
| 7,602,222 B2 | 10/2009 | Pyeon et al. | |
| 8,923,087 B2 | 12/2014 | Mehta et al. | |
| 9,407,200 B2 | 8/2016 | Verma et al. | |
| 10,062,453 B1* | 8/2018 | Griffin ................ | G11C 29/022 |
| 2002/0018387 A1* | 2/2002 | Nam ..................... | G11C 11/406 |
| | | | 365/222 |
| 2010/0271092 A1* | 10/2010 | Zerbe .................. | G11C 7/1093 |
| | | | 327/161 |
| 2011/0055671 A1* | 3/2011 | Kim ..................... | G11C 7/1069 |
| | | | 365/194 |

(Continued)

FOREIGN PATENT DOCUMENTS

| | | |
|---|---|---|
| KR | 10-0468723 B1 | 1/2005 |
| KR | 10-2020-0051330 A | 5/2020 |

*Primary Examiner* — Volvick Derose
(74) *Attorney, Agent, or Firm* — Fish & Richardson P.C.

(57) ABSTRACT

In a method of operating a memory device, a first command to allow the memory device to enter an idle mode is received. A reference time interval is adjusted based on process, voltage and temperature (PVT) variation associated with the memory device. The reference time interval is used to determine a start time point of a power control operation for reducing power consumption of the memory device. A first time interval during which the idle mode is maintained is internally measured based on the first command. The power control operation is performed in response to the first time interval being longer than the reference time interval.

18 Claims, 17 Drawing Sheets

(56) References Cited

U.S. PATENT DOCUMENTS

| | | | |
|---|---|---|---|
| 2013/0191665 A1* | 7/2013 | Mehta | G06F 1/324 |
| | | | 713/323 |
| 2013/0305074 A1* | 11/2013 | Ellis | G11C 11/4074 |
| | | | 713/324 |
| 2015/0178001 A1* | 6/2015 | Chien | G06F 3/064 |
| | | | 711/102 |
| 2015/0249449 A1 | 9/2015 | Cai et al. | |
| 2016/0180953 A1* | 6/2016 | Darragh | G11C 16/349 |
| | | | 365/185.11 |
| 2016/0224272 A1* | 8/2016 | Kim | G11C 11/4093 |
| 2019/0304534 A1* | 10/2019 | Morgan | G11C 11/40618 |
| 2020/0142473 A1 | 5/2020 | Kim | |

* cited by examiner

| TYPE | CHARACTERISTIC | REFERENCE TIME INTERVAL |
|---|---|---|
| NT | CRT1 | TREF1 |
| PT | CRT2 | |

| VOLTAGE | REFERENCE TIME INTERVAL |
|---------|-------------------------|
| V1 | TREF21 |
| V2 | TREF22 |
| V3 | TREF23 |
| ⋮ | ⋮ |

| TEMPERATURE | REFERENCE TIME INTERVAL |
|-------------|-------------------------|
| T1 | TREF31 |
| T2 | TREF32 |
| T3 | TREF33 |
| ⋮ | ⋮ |

METHOD OF OPERATING MEMORY DEVICE AND MEMORY DEVICE PERFORMING THE SAME

CROSS-REFERENCE TO RELATED APPLICATION

This application claims priority under 35 USC § 119 to Korean Patent Application No. 10-2021-0116346 filed on Sep. 1, 2021 in the Korean Intellectual Property Office (KIPO), the contents of which are herein incorporated by reference in their entirety.

BACKGROUND

1. Technical Field

Exemplary embodiments relate generally to semiconductor integrated circuits, and more particularly to methods for operating memory devices and memory devices for performing such methods.

2. Description of the Related Art

Semiconductor memory devices can be generally divided into two categories depending upon whether they retain stored data when disconnected from power. These two categories are referred to as volatile memory devices, which lose stored data when disconnected from power, and non-volatile memory devices, which retain stored data when disconnected from power. Recently, the volatile memory device may be employed in various mobile systems. Since it is important to reduce power consumption of the mobile system, researchers are also conducting various research projects on techniques to reduce power consumption of the volatile memory device included in the mobile system.

SUMMARY

At least one exemplary embodiment of the present disclosure provides a method of operating a memory device capable of efficiently reducing power consumption in an idle mode, such as a power down mode, a sleep mode, or the like.

At least one exemplary embodiment of the present disclosure provides a memory device that performs the method of operating the memory device.

According to exemplary embodiments, in a method of operating a memory device, a first command to allow the memory device to enter an idle mode is received. A reference time interval is adjusted based on process, voltage and temperature (PVT) variation associated with the memory device. The reference time interval is used to determine a start time point of a power control operation for reducing power consumption of the memory device. A first time interval during which the idle mode is maintained is internally measured based on the first command. The power control operation is performed in response to the first time interval being longer than the reference time interval.

According to exemplary embodiments, a memory device includes a command decoder, a timer, a reference time interval control circuit, a power control circuit and a logic block. The command decoder receives a first command to allow the memory device to enter an idle mode. The timer internally measures a first time interval during which the idle mode is maintained based on the first command. The reference time interval control circuit adjusts a reference time interval based on process, voltage and temperature (PVT) variation associated with the memory device. The reference time interval is used to determine a start time point of a power control operation for reducing power consumption of the memory device. The power control circuit performs the power control operation in response to the first time interval being longer than the reference time interval. Power consumption of the logic block is reduced by the power control operation.

According to exemplary embodiments, in a method of operating a memory device, a first command to allow the memory device to enter an idle mode is received and a power control enable signal is generated based on the first command A reference time interval is adjusted based on process, voltage and temperature (PVT) variation associated with the memory device. The reference time interval is used to determine a start time point of a power control operation for reducing power consumption of the memory device. A first time interval during which the idle mode is maintained is internally measured using a timer that is activated based on the power control enable signal. The power control operation is performed, using a power control circuit that is activated based on the power control enable signal, in response to the first time interval being longer than the reference time interval. In response to the memory device receiving a second command to allow the memory device to exit the idle mode after the power control operation is performed, the power control operation is terminated and the idle mode is exited. In response to the memory device receiving the second command before the first time interval becomes longer than the reference time interval, the idle mode is exited without performing the power control operation. When adjusting the reference time interval, the reference time interval is set based on characteristics of a plurality of transistors included in the memory device. The characteristics of the plurality of transistors are determined when the memory device is manufactured. The reference time interval is set based on an operating voltage of the memory device. The reference time interval is set based on an operating temperature of the memory device. When performing the power control operation, a power gating operation to block a power supply voltage applied to the memory device is performed. An adaptive body biasing operation to adjust at least one body bias voltage applied to the plurality of transistors is performed.

In the method of operating the memory device and the memory device according to exemplary embodiments, the first time interval during which the memory device maintains the idle mode may be detected, the power control operation may be omitted when the first time interval is shorter than or equal to the reference time interval, and the power control operation may be performed only when the first time interval is longer than the reference time interval to reduce the power consumption of the memory device. In addition, the reference time interval may be adjusted or controlled based on process, voltage and temperature information, and thus an optimal timing for performing the power control operation when the memory device enters the idle mode may be determined. Accordingly, the power consumption of the memory device may be efficiently reduced.

BRIEF DESCRIPTION OF THE DRAWINGS

Illustrative, non-limiting example embodiments will be more clearly understood from the following detailed description taken in conjunction with the accompanying drawings.

FIG. 5 is a block diagram illustrating an example of a timer included in a memory device of FIGS. 3 and 4.

FIGS. 6, 7 and 8 are diagrams illustrating examples of a process, voltage and temperature table included in a reference time interval control circuit included in a memory device of FIG. 4.

DETAILED DESCRIPTION OF THE PREFERRED EMBODIMENTS

Figure 1:
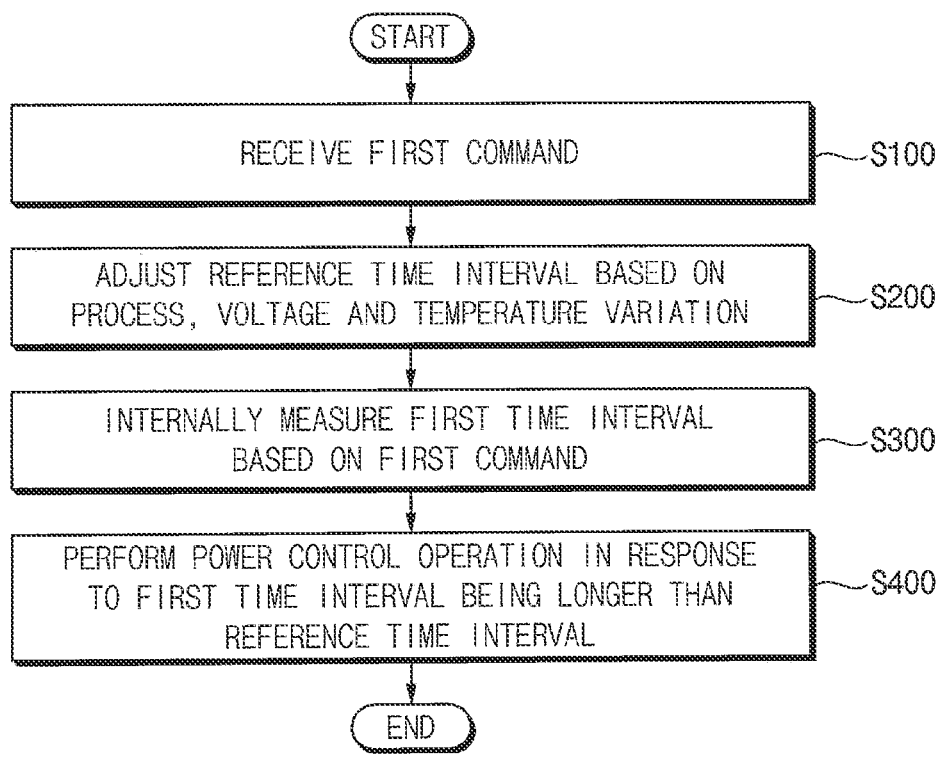
FIG. 1 is a flowchart illustrating a method of operating a memory device according to exemplary embodiments.

Various exemplary embodiments will be described more fully with reference to the accompanying drawings, in which such exemplary embodiments are illustrated. The present disclosure may, however, be embodied in many different forms and should not be construed as limited to the exemplary embodiments set forth herein. Like reference numerals refer to like elements throughout this application.

Figure 2:
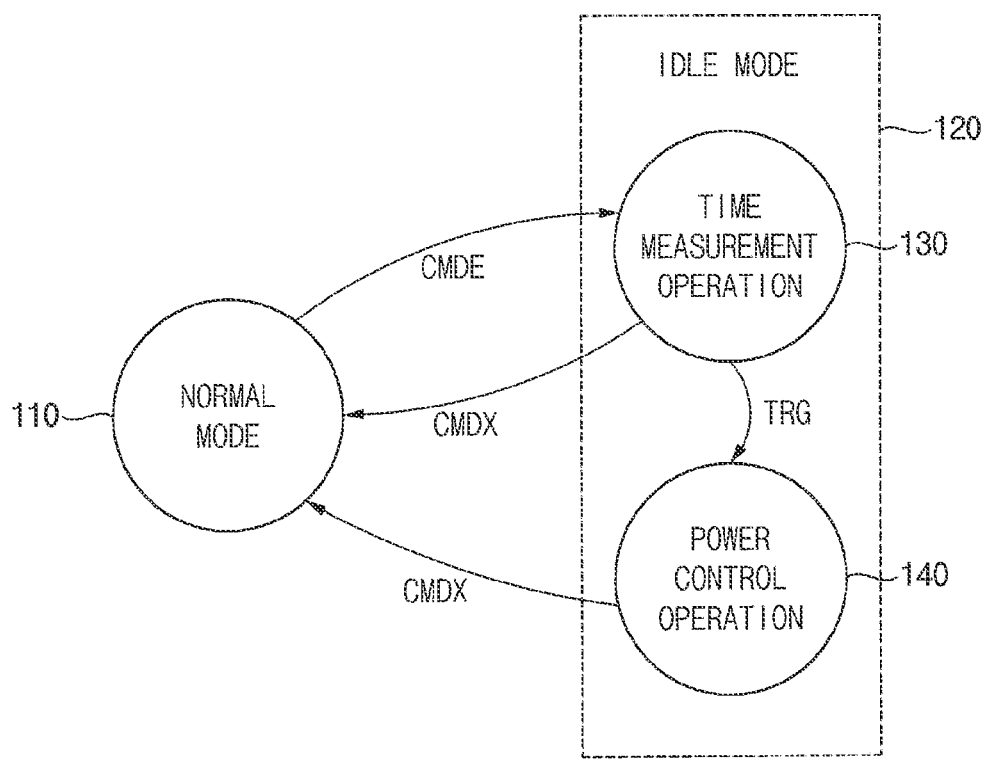
FIG. 2 is a diagram for describing an operation mode of a memory device according to exemplary embodiments.

FIG. 1 is a flowchart illustrating a method of operating a memory device according to exemplary embodiments. FIG. 2 is a diagram for describing an operation mode of a memory device according to exemplary embodiments.

Referring to FIGS. 1 and 2, in a method of operating a memory device according to exemplary embodiments, the memory device operates in a normal mode in which a normal operation is performed and an idle mode (or a low power mode) in which a low power operation is performed.

For example, as illustrated in FIG. 2, a normal mode 110 represents a general operation mode in which a data write operation, a data read operation, or the like, are performed. An idle mode 120 includes a power down mode, a sleep mode, a deep sleep mode, or the like, for reducing power consumption of the memory device, and may further include a refresh mode in which a refresh operation is performed to preserve, retain or maintain stored data. The memory device enters the idle mode 120 from the normal mode 110 in response to receiving a first command CMDE, and exits the idle mode 120 in response to receiving a second command CMDX and returns to the normal mode 110.

According to exemplary embodiments, a power control operation 140 for reducing power consumption of the memory device may not be immediately performed as soon as the memory device enters the idle mode 120. For example, a time measurement operation 130 may be performed to measure a time interval (or duration) during which the idle mode 120 is maintained, and then a trigger signal TRG for performing the power control operation 140 may be generated only when the measured time interval is longer than a reference time interval, and then the power control operation 140 may be performed based on the trigger signal TRG Hereinafter, exemplary embodiments will be described in detail based on a case of performing the power control operation 140.

While the memory device operates in the normal mode 110, the memory device receives the first command CMDE (step S100). The first command CMDE may be a command for entering the idle mode 120 and/or to allow the memory device to enter the idle mode 120. The memory device may immediately enter the idle mode 120 at a first time point at which the first command CMDE is received, however, the power control operation 140 may not be performed at the first time point. For example, the first command CMDE may include one of a power down mode entry command, a sleep mode entry command, a deep sleep mode entry command and a refresh mode entry command.

The reference time interval is adjusted or controlled based on process, voltage and temperature (PVT) variation associated with or related to the memory device (step S200). The reference time interval may be used to determine a start time point of the power control operation 140 for reducing power consumption of the memory device. For example, the memory device may include a reference time interval control circuit (e.g., a reference time interval control circuit 320 in FIG. 3) for performing step S200. Step S200 will be described in detail with reference to FIGS. 11 through 15.

A first time interval during which the idle mode 120 is maintained is internally measured based on the first command CMDE (step S300). For example, the memory device may include a timer (e.g., a timer 310 in FIG. 3) for performing step S300, and step S300 may be performed by the memory device by itself rather than by a host device and/or a memory controller that are located outside the memory device. Step S300 will be described in detail with reference to FIG. 16.

When the first time interval is longer than the reference time interval (or in response to the first time interval being longer than the reference time interval), the power control operation 140 for reducing the power consumption of the memory device is performed (step S400). The power control operation 140 may start to be performed at a second time point at which the first time interval becomes longer than the reference time interval (or at a second time point that has elapsed more than the reference time interval from the first time point). For example, the power control operation 140 may include a power gating operation, and may further include an adaptive body biasing operation. For example, the memory device may include a power control circuit (e.g., a power control circuit 330 in FIG. 3) for performing step S400. Step S400 will be described in detail with reference to FIGS. 17 through 21.

Steps S200 and S300 in FIG. 1 may correspond to the time measurement operation 130 in FIG. 2, and step S400 in FIG. 1 may correspond to the power control operation 140 in FIG. 2.

Although not illustrated in detail, as will be described with reference to FIGS. 22 and 23, when the first time interval is shorter than or equal to the reference interval (or in response to the first time interval being shorter than or equal to the reference interval), the memory device may exit the idle mode 120 without performing the power control operation 140.

In the method of operating the memory device according to exemplary embodiments, the first time interval during which the memory device maintains the idle mode 120 may be detected, the power control operation 140 may be omitted when the first time interval is shorter than or equal to the reference time interval, and the power control operation 140 may be performed only when the first time interval is longer than the reference time interval to reduce the power consumption of the memory device. In addition, the reference time interval may be adjusted or controlled based on process, voltage and temperature information, and thus an optimal timing for performing the power control operation 140 when the memory device enters the idle mode 120 may be determined. Accordingly, the power consumption of the memory device may be efficiently reduced.

Figure 3:
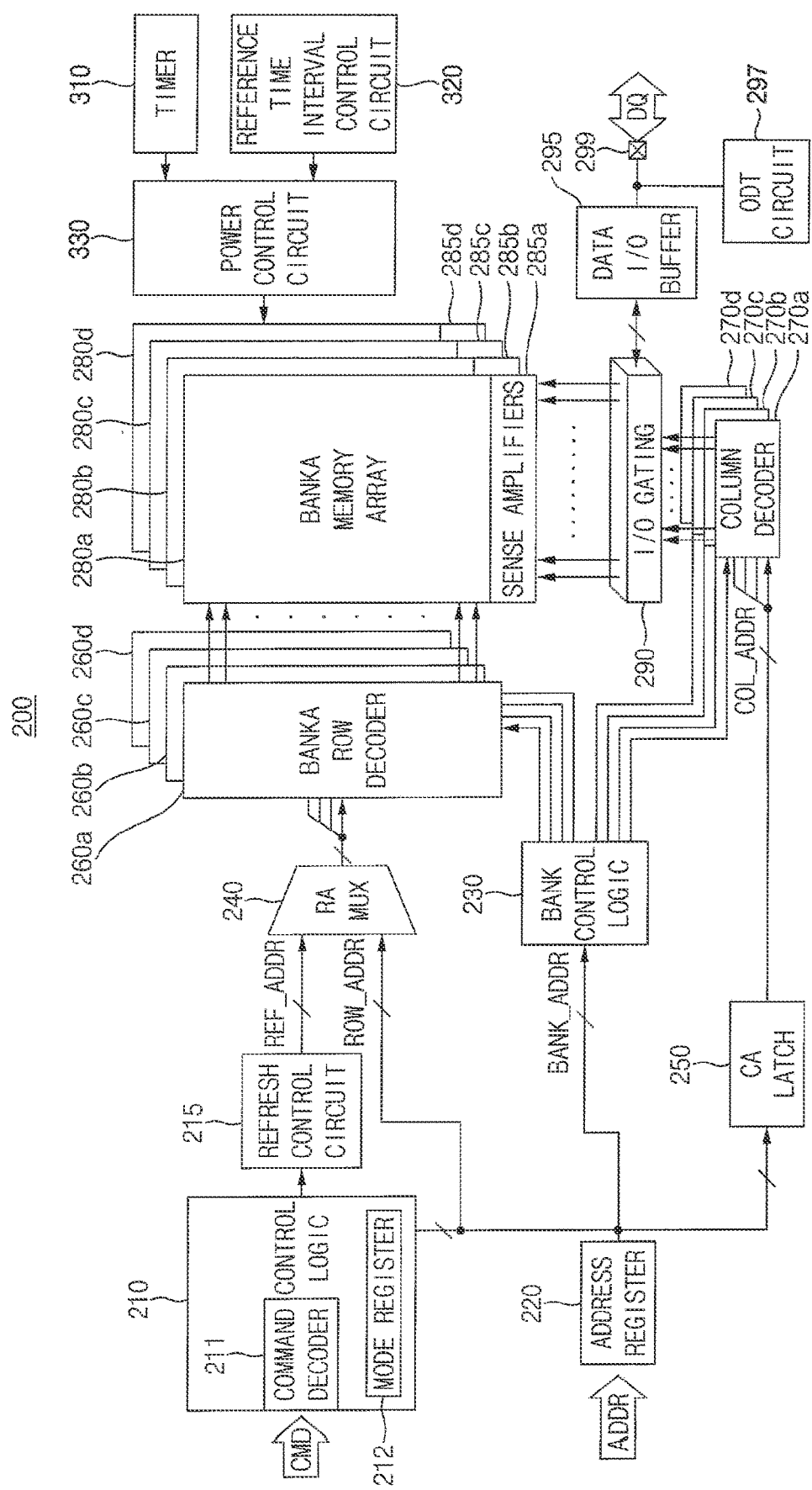
FIGS. 3 and 4 are block diagrams illustrating a memory device according to exemplary embodiments.
Figure 4:
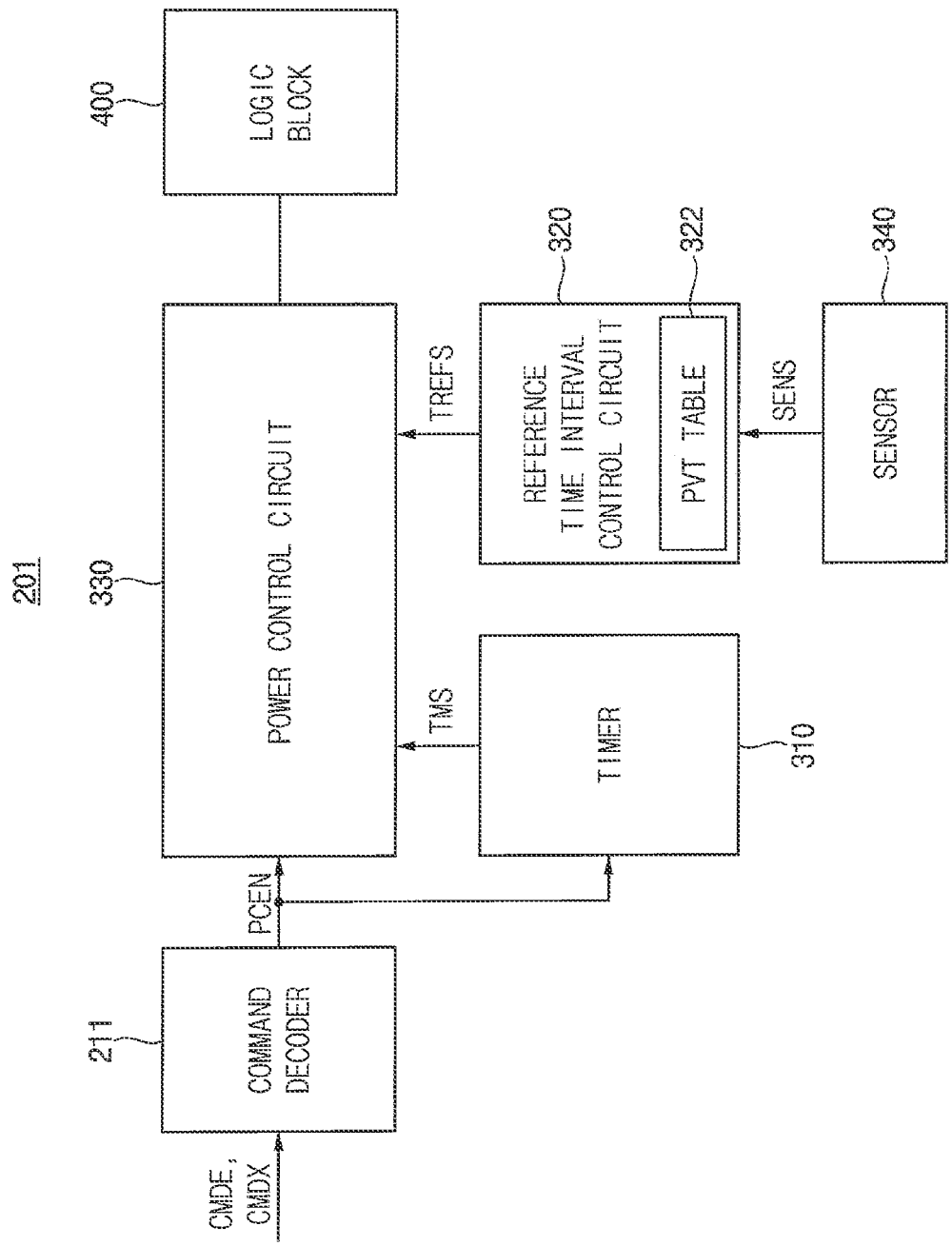

FIGS. 3 and 4 are block diagrams illustrating a memory device according to exemplary embodiments.

Referring to FIGS. 2 and 3, a memory device 200 may include a control logic circuit 210, a refresh control circuit 215, an address register 220, a bank control logic circuit 230, a row address multiplexer 240, a column address latch 250, a row decoder, a column decoder, a memory cell array, a sense amplifier unit (e.g., sense amplifier), an input/output (I/O) gating circuit 290, a data I/O buffer 295, an on-die termination (ODT) circuit 297, a data I/O pin (or pad) 299, a timer 310, a reference time interval control circuit 320 and a power control circuit 330. It is understood that one or more other exemplary embodiments are not limited to the specific combination and number of components illustrated and described in FIG. 3.

In some exemplary embodiments, the memory device 200 itself may be the device that performs the method of operating the memory device according to exemplary embodiments, and may be, by way of example, a volatile memory device. For example, the memory device 200 may be one of various volatile memory devices such as a dynamic random access memory (DRAM), a mobile DRAM, a dual data rate (DDR) DRAM, a low power DDR (LPDDR) DRAM, a graphic DDR (GDDR) DRAM, or the like.

The memory cell array includes a plurality of memory cells. The memory cell array may include a plurality of bank arrays, e.g., first through fourth bank arrays 280*a*, 280*b*, 280*c* and 280*d*. The row decoder may include a plurality of bank row decoders, e.g., first through fourth bank row decoders 260*a*, 260*b*, 260*c* and 260*d* respectively connected to the first through fourth bank arrays 280*a*, 280*b*, 280*c* and 280*d*. The column decoder may include a plurality of bank column decoders, e.g., first through fourth bank column decoders 270*a*, 270*b*, 270*c* and 270*d* respectively connected to the first through fourth bank arrays 280*a*, 280*b*, 280*c* and 280*d*. The sense amplifier unit may include a plurality of bank sense amplifiers, e.g., first through fourth bank sense amplifiers 285*a*, 285*b*, 285*c* and 285*d* respectively connected to the first through fourth bank arrays 280*a*, 280*b*, 280*c* and 280*d*.

The first through fourth bank arrays 280*a* to 280*d*, the first through fourth bank row decoders 260*a* to 260*d*, the first through fourth bank column decoders 270*a* to 270*d*, and the first through fourth bank sense amplifiers 285*a* to 285*d* may form first through fourth banks, respectively. For example, the first bank array 280*a*, the first bank row decoder 260*a*, the first bank column decoder 270*a*, and the first bank sense amplifier 285*a* may form the first bank; the second bank array 280*b*, the second bank row decoder 260*b*, the second bank column decoder 270*b*, and the second bank sense amplifier 285*b* may form the second bank; the third bank array 280*c*, the third bank row decoder 260*c*, the third bank column decoder 270*c*, and the third bank sense amplifier 285*c* may form the third bank; and the fourth bank array 280*d*, the fourth bank row decoder 260*d*, the fourth bank column decoder 270*d*, and the fourth bank sense amplifier 285*d* may form the fourth bank. Although FIG. 3 illustrates the memory device 200 as including four banks, it is understood that one or more other exemplary embodiments are not limited thereto, and the memory device 200 may include any number of banks. It is also understood that while the components illustrated in FIG. 3 in quantities of four have a one-to-one correspondence with each other, one or more other exemplary embodiments are not limited thereto. For example, there could be more or less decoders or sensors than shown.

Figure 25:
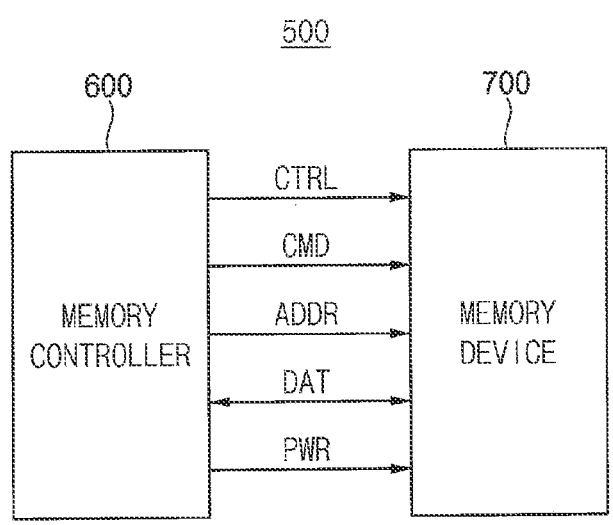
FIG. 25 is a block diagram illustrating a memory system including a memory device according to exemplary embodiments.

The address register 220 may receive an address ADDR including a bank address BANK_ADDR, a row address ROW_ADDR and a column address COL_ADDR from a memory controller (e.g., a memory controller 600 in FIG. 25). The address register 220 may provide the received bank address BANK_ADDR to the bank control logic circuit 230, may provide the received row address ROW_ADDR to the row address multiplexer 240, and may provide the received column address COL_ADDR to the column address latch 250.

The bank control logic circuit 230 may generate bank control signals in response to a received bank address BANK_ADDR. One of the first through fourth bank row decoders 260*a* to 260*d* corresponding to the received bank address BANK_ADDR may be activated in response to the bank control signals generated by the bank control logic circuit 230, and one of the first through fourth bank column decoders 270*a* to 270*d* corresponding to the received bank address BANK_ADDR may be activated in response to the bank control signals generated by the bank control logic circuit 230.

The refresh control circuit 215 may generate a refresh address REF_ADDR in response to receiving a refresh command or entrance of any self refresh mode. For example, the refresh control circuit 215 may include a refresh counter that is configured to sequentially change the refresh address REF_ADDR from a first address of the memory cell array to a last address of the memory cell array. The refresh control circuit 215 may receive control signals from the control logic circuit 210.

The row address multiplexer 240 may receive the row address ROW_ADDR from the address register 220, and may receive the refresh address REF_ADDR from the refresh control circuit 215. The row address multiplexer 240 may selectively output the row address ROW_ADDR or the refresh address REF_ADDR. A row address output from the row address multiplexer 240 (e.g., the row address ROW_ADDR or the refresh address REF_ADDR) may be applied to the first through fourth bank row decoders 260a to 260d.

The activated one of the first through fourth bank row decoders 260a to 260d may decode the row address output from the row address multiplexer 240, and may activate a wordline corresponding to the row address. For example, the activated bank row decoder may apply a wordline driving voltage to the wordline corresponding to the row address.

The column address latch 250 may receive the column address COL_ADDR from the address register 220, and may temporarily store the received column address COL_ADDR. The column address latch 250 may apply the temporarily stored or received column address COL_ADDR to the first through fourth bank column decoders 270a to 270d.

The activated one of the first through fourth bank column decoders 270a to 270d may decode the column address COL_ADDR output from the column address latch 250, and may control the I/O gating circuit 290 to output data corresponding to the column address COL_ADDR.

The I/O gating circuit 290 may include a circuitry for gating I/O data. For example, although not illustrated in detail, the I/O gating circuit 290 may include an input data mask logic, read data latches for storing data output from the first through fourth bank arrays 280a to 280d, and write drivers for writing data to the first through fourth bank arrays 280a to 280d.

Data to be read from one of the first through fourth bank arrays 280a to 280d may be sensed by a sense amplifier coupled to the corresponding bank array, and may be stored in the read data latches. The data stored in the read data latches may be provided to the memory controller via the data I/O buffer 295 and the data I/O pin 299. Data received via the data I/O pin 299 that is to be written to one of the first through fourth bank arrays 280a-280d may be provided from the memory controller to the data I/O buffer 295. The data received via the data I/O pin 299 and provided to the data I/O buffer 295 may be written to the corresponding bank array via the write drivers in the I/O gating circuit 290.

The control logic circuit 210 may control an operation of the memory device 200. For example, the control logic circuit 210 may generate control signals for the memory device 200 to perform a data write operation or a data read operation. The control logic circuit 210 may include a command decoder 211 that decodes a command CMD received from the memory controller and a mode register 212 that sets an operation mode of the memory device 200. For example, the command decoder 211 may generate the control signals corresponding to the command CMD by decoding a write enable signal (e.g., /WE), a row address strobe signal (e.g., /RAS), a column address strobe signal (e.g., /CAS), a chip select signal (e.g., /CS), etc. The control logic circuit 210 may further receive a clock signal (e.g., CK) and a clock enable signal (e.g., /CKE) for operating the memory device 200 in a synchronous manner.

The ODT circuit 297 may be connected to the data I/O pin 299 and the data I/O buffer 295. When the ODT circuit 297 is enabled, an ODT operation may be performed. The ODT operation may reduce (and/or prevent) a signal from being reflected by using a termination resistor so as to improve signal integrity.

The timer 310 may perform step S300 in FIG. 1, e.g., an operation of internally measuring the first time interval during which the memory device 200 maintains the idle mode. The reference time interval control circuit 320 may perform step S200 in FIG. 1, e.g., an operation of adjusting the reference time interval used to determine the start time point of the power control operation 130 based on the process, voltage and temperature variation associated with the memory device 200. The power control circuit 330 may perform step S400 in FIG. 1, e.g., an operation for performing the power control operation 130 in response to the first time interval being longer than the reference time interval.

Although the memory device according to exemplary embodiments is described based on a DRAM, the memory device according to exemplary embodiments may be any volatile memory device and/or nonvolatile memory device, e.g., a static random access memory (SRAM), a flash memory, a phase random access memory (PRAM), a resistive random access memory (RRAM), a nano floating gate memory (NFGM), a polymer random access memory (PoRAM), a magnetic random access memory (MRAM), a ferroelectric random access memory (FRAM), a thyristor random access memory (TRAM), etc.

Detailed configurations and operations of the timer 310, the reference time interval control circuit 320 and the power control circuit 330 will be described with reference to FIGS. 4 through 10.

Referring to FIGS. 2 and 4, a memory device 201 may include a command decoder 211, a timer 310, a reference time interval control circuit 320, a power control circuit 330 and a logic block (or circuit) 400. The memory device 201 may further include a sensor 340. For convenience of illustration, only components used to perform the method of operating the memory device according to exemplary embodiments are illustrated in FIG. 4.

The command decoder 211 may receive the first command CMDE to allow the memory device 201 to enter the idle mode 120. The command decoder 211 may generate a power control enable signal PCEN based on the first command CMDE. For example, the power control enable signal PCEN may be activated based on a reception of the first command CMDE. The command decoder 211 may be substantially the same as the command decoder 211 in FIG. 3.

The timer 310 may internally measure a first time interval during which the memory device 201 maintains the idle mode 120. The timer 310 may be enabled or activated based on the first command CMDE (e.g., based on an activation of the power control enable signal PCEN), may generate a measured time signal TMS that represents a result of internally measuring the first time interval, and may transmit the measured time signal TMS to the power control circuit 330. The timer 310 may be substantially the same as the timer 310 in FIG. 3. An example of the timer 310 will be described with reference to FIG. 5.

The reference time interval control circuit 320 may adjust or control a reference time interval used to determine a start time point of the power control operation 140 for reducing power consumption of the memory device 201, based on process, voltage and temperature variation associated with the memory device 201. The reference time interval control circuit 320 may generate a reference time interval signal TREFS that represents the reference time interval, and may transmit the reference time interval signal TREFS to the power control circuit 330.

In some exemplary embodiments, the reference time interval control circuit 320 may include a process, voltage and temperature table 322 that includes information associated with process, voltage and temperature of the memory device 201. For example, the process, voltage and temperature table 322 may include information associated with characteristics of transistors included in the memory device 201, information associated with an operating voltage of the memory device 201, information associated with an operating temperature of the memory device 201, or the like. An example of the process, voltage and temperature table 322 will be described with reference to FIGS. 6, 7 and 8.

The power control circuit 330 may perform the power control operation 140 when the first time interval is longer than the reference time interval. The power control circuit 330 may be enabled or activated based on the first command CMDE (e.g., based on the activation of the power control enable signal PCEN), may receive the measured time signal TMS and the reference time interval signal TREFS, and may determine whether the first time interval is longer than the reference time interval based on the measured time signal TMS and the reference time interval signal TREFS. The power control circuit 330 may be substantially the same as the power control circuit 330 in FIG. 3. An example of the power control circuit 330 will be described with reference to FIGS. 9 and 10.

The logic block 400 may be connected to the power control circuit 330, and power consumption of the logic block 400 may be reduced by the power control operation 140. For example, the logic block 400 may include at least one of a memory cell array and a peripheral circuit that are included in the memory device 201, and the peripheral circuit may be used to drive or operate the memory cell array. For example, the peripheral circuit may include at least one of the control logic circuit 210, the refresh control circuit 215, the address register 220, the bank control logic circuit 230, the row address multiplexer 240, the column address latch 250, the row decoder, the column decoder, the sense amplifier unit, the I/O gating circuit 290 and the data I/O buffer 295 in FIG. 3. For example, as will be described with reference to FIG. 10, the logic block 400 may include a plurality of transistors.

The sensor 340 may detect a present operating environment of the memory device 201, and may generate a sensing signal SENS that represents the present operating environment of the memory device 201. For example, the present operating environment of the memory device 201 may include at least one of the operating voltage and the operating temperature of the memory device 201, and the sensor 340 may include at least one of a voltage sensor and a temperature sensor. The sensor 340 may transmit the sensing signal SENS to the reference time interval control circuit 320, and the reference time interval control circuit 320 may adjust the reference time interval based on the present operating environment of the memory device 201 (e.g., based on the sensing signal SENS).

However, exemplary embodiments are not limited thereto. For example, the present operating environment of the memory device 201 may include at least one of humidity, pressure, motion, time, space, illuminance, acceleration, vibration, mechanical stress, shock, radiation, dust, electrical stress, or the like, and the sensor 340 may include at least one of a humidity sensor, a pressure sensor, a motion sensor, a temporal sensor, a spatial sensor, an illumination sensor, an acceleration sensor, a vibration sensor, a mechanical stress sensor, a shock sensor, a radiation sensor, a dust sensor, an electrical stress sensor, or the like. The reference time interval control circuit 320 may adjust the reference time interval based on the above-described various environmental parameters other than the operating voltage and the operating temperature.

In addition, the command decoder 211 may receive the second command CMDX to allow the memory device 201 to exit the idle mode 120, and may generate the power control enable signal PCEN based on the second command CMDX. For example, the power control enable signal PCEN may be deactivated based on a reception of the second command CMDX. The timer 310 and the power control circuit 330 may be disabled or deactivated based on the second command CMDX (e.g., based on a deactivation of the power control enable signal PCEN), and the operation of internally measuring the first time interval and the power control operation 140 may not be performed.

Figures 5, 6:
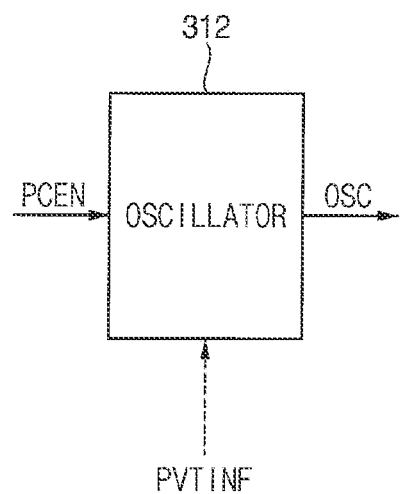

FIG. 5 is a block diagram illustrating an example of a timer included in a memory device of FIGS. 3 and 4.

Referring to FIGS. 3, 4 and 5, the timer 310 may include an oscillator 312.

The oscillator 312 may generate an oscillation signal OSC. The oscillation signal OSC may be a signal that regularly toggles between a high level and a low level with a predetermined period. For example, the oscillator 312 may include a ring oscillator, an RC oscillator, a crystal oscillator, or a temperature compensated crystal oscillator (TCXO), but exemplary embodiments are not limited thereto.

In some exemplary embodiments, the operation of internally measuring the first time interval may be performed using the oscillator 312. For example, the first time interval may be measured by counting the number of cycles (or edges) of the oscillation signal OSC generated from the oscillator 312 after the first command CMDE is received (e.g., after the power control enable signal PCEN is activated).

In some exemplary embodiments, the operation of adjusting the reference time interval may be performed by adjusting a frequency of the oscillation signal OSC. For example, it may be determined that the first time interval is longer than the reference time interval when the number of the counted cycles of the oscillation signal OSC is greater than or equal to X, where X is a natural number. In this example, when a length of one cycle (or period) of the oscillation signal OSC increases, e.g., when the frequency of the oscillation signal OSC decreases, the reference time interval may increase. Similarly, when the length of one cycle of the oscillation signal OSC decreases, e.g., when the frequency of the oscillation signal OSC increases, the reference time interval may decrease. For example, the frequency of the oscillation signal OSC may be adjusted based on information PVTINF, which is obtained from the process, voltage and temperature table 322 based on the present operating environment (e.g., based on the sensing signal SENS).

FIGS. 6, 7 and 8 are diagrams illustrating examples of a process, voltage and temperature table included in a reference time interval control circuit included in a memory device of FIG. 4.

Referring to FIGS. 4 and 6, the process, voltage and temperature table 322 may include a first table 322*a*. The first table 322*a* may be associated with or related to process variation. The process variation may represent a phenomenon in which characteristics of a plurality of transistors included in a memory device become different from each other due to a manufacturing process. For example, the memory device may include n-type metal oxide semiconductor (NMOS) transistors and p-type metal oxide semiconductor (PMOS) transistors, and the characteristic of the plurality of transistors may include an operating speed. In this example, an operating speed of the NMOS transistor may correspond to one of fast, typical and slow, an operating speed of the PMOS transistor may also correspond to one of fast/typical/slow, and usually one of five cases (in an order of NMOS/PMOS) of FF (fast/fast), FS (fast/slow), TT (typical/typical), SF (slow/fast) and SS (slow/slow) may be considered as a characteristic of the transistors.

The first table 322a may be used to set the reference time interval based on the characteristics of the plurality of transistors included in the memory device. The characteristics of the plurality of transistors may be determined when the memory device is manufactured. For example, the first table 322a may represent a relationship between the characteristics of the plurality of transistors included in the memory device and the reference time interval.

For example, as illustrated in FIG. 6, an NMOS transistor NT included in the memory device may have a first operating characteristic CRT1, a PMOS transistor PT included in the memory device may have a second operating characteristic CRT2, and the reference time interval may be set to TREF1 based on the first operating characteristic CRT1 of the NMOS transistor NT and the second operating characteristic CRT2 of the PMOS transistor PT. For example, the first table 322a of FIG. 6 may be determined and stored when the memory device is manufactured (e.g., based on a testing result the memory device).

Referring to FIGS. 4 and 7, the process, voltage and temperature table 322 may include a second table 322b. The second table 322b may be associated with or related to voltage variation. The voltage variation may represent a phenomenon in which characteristics of a plurality of transistors included in a memory device become different from each other depending on an operating voltage of the memory device.

The second table 322b may be used to set the reference time interval based on the operating voltage of the memory device. For example, the second table 322b may represent a relationship between the operating voltage of the memory device and the reference time interval.

For example, as illustrated in FIG. 7, when the operating voltage of the memory device has a first voltage level (or a first voltage level range) V1, the reference time interval may be set to TREF21. When the operating voltage of the memory device has a second voltage level (or a second voltage level range) V2, the reference time interval may be set to TREF22. When the operating voltage of the memory device has a third voltage level (or a third voltage level range) V3, the reference time interval may be set to TREF23. For example, the second table 322b of FIG. 7 may be determined and stored when the memory device is manufactured, and the reference time interval may be changed, based on the operating voltage of the memory device and the second table 322b, in real time (or during runtime) while the memory device is operating. For example, the operating voltage of the memory device may be obtained based on the sensing signal SENS provided from the sensor 340.

In some exemplary embodiments, the reference time interval may decrease as the operating voltage of the memory device increases, and the reference time interval may increase as the operating voltage of the memory device decreases. For example, when V1<V2<V3, it may be that TREF21>TREF22>TREF23.

In some exemplary embodiments, the reference time intervals TREF21, TREF22 and TREF23 included in the second table 322b of FIG. 7 may be determined based on the reference time interval TREF1 included in the first table 322a of FIG. 6. For example, TREF21=TREF1+A1, TREF22=TREF1+A2, and TREF23=TREF1+A3, where each of A1, A2 and A3 are real numbers. For example, when TREF21>TREF22>TREF23, it may be that A1>A2>A3.

Referring to FIGS. 4 and 8, the process, voltage and temperature table 322 may include a third table 322c. The third table 322c may be associated with or related to temperature variation. The temperature variation may represent a phenomenon in which the characteristics of a plurality of transistors included in a memory device become different from each other depending on an operating temperature of the memory device.

The third table 322c may be used to set the reference time interval based on the operating temperature of the memory device. For example, the third table 322c may represent a relationship between the operating temperature of the memory device and the reference time interval.

For example, as illustrated in FIG. 8, when the operating temperature of the memory device has a first temperature value (or a first temperature range) T1, the reference time interval may be set to TREF31. When the operating temperature of the memory device has a second temperature value (or a second temperature range) T2, the reference time interval may be set to TREF32. When the operating temperature of the memory device has a third temperature value (or a third temperature range) T3, the reference time interval may be set to TREF33. For example, the third table 322c of FIG. 8 may be determined and stored when the memory device is manufactured, and the reference time interval may be changed, based on the operating temperature of the memory device and the third table 322c, in real time (or during runtime) while the memory device is operating. For example, the operating temperature of the memory device may be obtained based on the sensing signal SENS provided from the sensor 340.

In some exemplary embodiments, the reference time interval may decrease as the operating temperature of the memory device increases, and the reference time interval may increase as the operating temperature of the memory device decreases. For example, when T1<T2<T3, it may be that TREF31>TREF32>TREF33.

In some exemplary embodiments, the reference time intervals TREF31, TREF32 and TREF33 included in the third table 322c of FIG. 8 may be determined based on the reference time interval TREF1 included in the first table 322a of FIG. 6. For example, TREF31=TREF1+B1, TREF32=TREF1+B2, and TREF33=TREF1+B3, where each of B1, B2 and B3 are real numbers. For example, when TREF31>TREF32>TREF33, it may be that B1>B2>B3.

In some exemplary embodiments, the process, voltage and temperature table 322 may include all of the first table 322a, the second table 322b and the third table 322c. In other exemplary embodiments, the process, voltage and temperature table 322 may include only one or two of the first table 322a, the second table 322b and the third table 322c.

Figure 9:
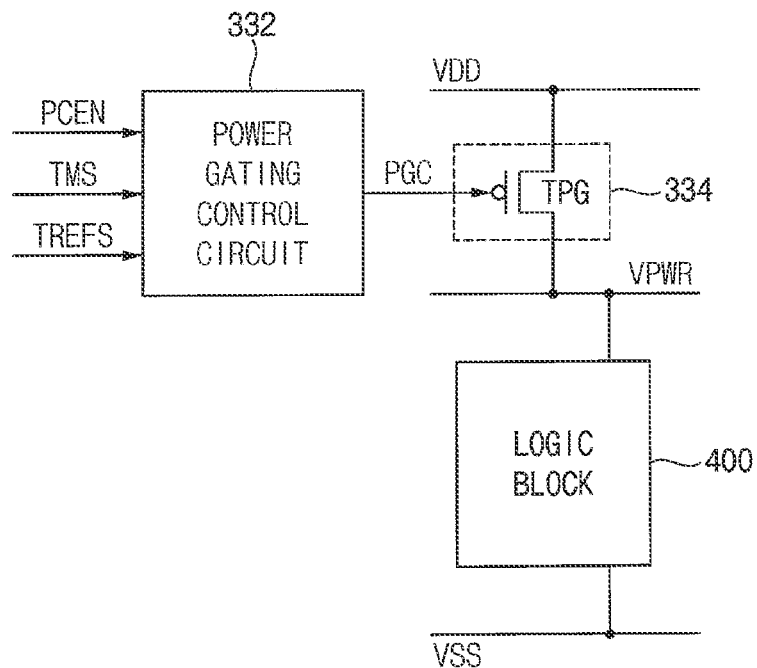
FIGS. 9 and 10 are block diagrams illustrating examples of a power control circuit included in a memory device of FIGS. 3 and 4.
Figure 10:
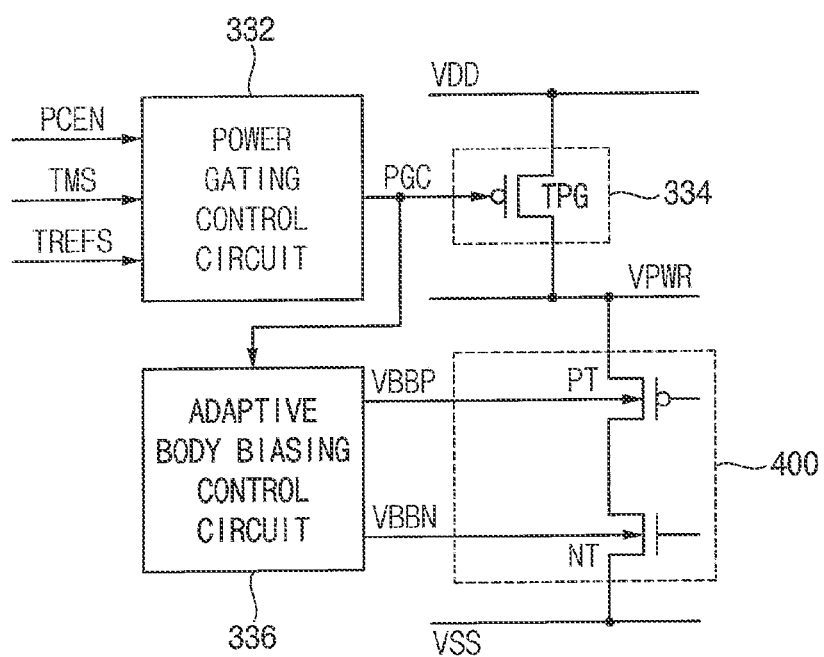

FIGS. 9 and 10 are block diagrams illustrating examples of a power control circuit included in a memory device of FIGS. 3 and 4.

Referring to FIGS. 3, 4 and 9, the power control circuit 330 may include a power gating control circuit 332 and a power gating circuit 334.

The power gating control circuit 332 and the power gating circuit 334 may perform a power gating operation to block or cut off a power supply voltage VDD applied to the memory device.

After the first command CMDE is received, e.g., after the power control enable signal PCEN is activated, the power gating control circuit 332 may compare the first time interval with the reference time interval based on the measured time signal TMS and the reference time interval signal TREFS, and may generate a power gating control signal PGC at the second time point at which the first time interval becomes longer than the reference time interval. For example, the power gating control signal PGC may be activated at the second time point.

Based on the power gating control signal PGC, e.g., based on an activation of the power gating control signal PGC, the power gating circuit 334 may block a power path through which the power supply voltage VDD is applied to the memory device (e.g., to the logic block 400).

The power gating circuit 334 may include a power gating transistor TPG that is connected between the power supply voltage VDD and a first voltage VPWR and includes a gate electrode receiving the power gating control signal PGC. While the memory device operates in the normal mode 110, the power gating transistor TPG may be turned on to supply the power supply voltage VDD to the memory device. When the memory device enters the idle mode 120 and while the memory device performs the power control operation 140, the power gating transistor TPG may be turned off to block a supply of the power supply voltage VDD to the memory device.

The logic block 400 may be connected between the first voltage VPWR and a ground voltage VSS. While the memory device operates in the normal mode 110, the logic block 400 may operate normally based on the power supply voltage VDD and the first voltage VPWR. When the memory device enters the idle mode 120 and while the memory device performs the power control operation 140, the logic block 400 may not operate because the power supply voltage VDD and the first voltage VPWR are blocked.

Referring to FIGS. 3, 4 and 10, the power control circuit 330 may include a power gating control circuit 332, a power gating circuit 334 and an adaptive body biasing control circuit 336. Descriptions repeated with respect to FIG. 9 will be omitted as redundant.

The adaptive body biasing control circuit 336 may perform an adaptive body biasing operation to adjust or control at least one body bias voltage applied to at least one transistor included in the memory device (e.g., included in the logic block 400).

Based on the power gating control signal PGC, e.g., based on an activation of the power gating control signal PGC, the adaptive body biasing control circuit 336 may change the at least one body bias voltage to increase a threshold voltage of the at least one transistor.

For example, the at least one transistor may include a PMOS transistor PT, and the at least one body bias voltage may include a first body bias voltage VBBP applied to the PMOS transistor PT. When the memory device enters the idle mode 120 and while the memory device performs the power control operation 140, the adaptive body biasing control circuit 336 may increase a voltage level of the first body bias voltage VBBP applied to the PMOS transistor PT.

For example, the at least one transistor may include an NMOS transistor NT, and the at least one body bias voltage may include a second body bias voltage VBBN applied to the NMOS transistor NT. When the memory device enters the idle mode 120 and while the memory device performs the power control operation 140, the adaptive body biasing control circuit 336 may decrease a voltage level of the second body bias voltage VBBN applied to the NMOS transistor NT.

In some exemplary embodiments, an operation of increasing the voltage level of the first body bias voltage VBBP and an operation of decreasing the voltage level of the second body bias voltage VBBN may be substantially simultaneously or concurrently performed.

In some exemplary embodiments, the power supply voltage VDD or the first voltage VPWR in FIGS. 9 and 10 may correspond to the operating voltage of the memory device described with reference to FIG. 7.

Hereinafter, a method of operating the memory device according to exemplary embodiments will be described based on the configurations illustrated with reference to FIGS. 4 through 10.

Figure 11:
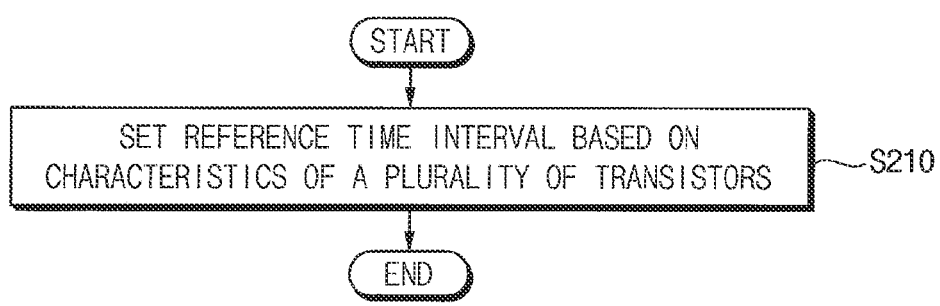
FIG. 11 is a flowchart illustrating an example of adjusting a reference time interval in FIG. 1.

FIG. 11 is a flowchart illustrating an example of adjusting a reference time interval in HG 1.

Referring to FIGS. 1 and 11, when adjusting the reference time interval (step S200), the reference time interval may be set based on characteristics of a plurality of transistors included in the memory device (step S210). The characteristics of the plurality of transistors may be determined when the memory device is manufactured. For example, step S210 may be performed by the reference time interval control circuit 320 and the process, voltage and temperature table 322 in FIGS. 3 and 4. For example, step S210 may be performed based on the first table 322a of FIG. 6.

Figure 12:
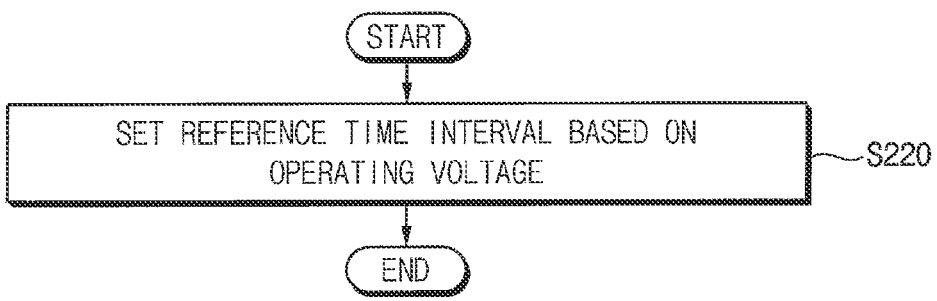
FIG. 12 is a flowchart illustrating another example of adjusting a reference time interval in FIG. 1.
Figure 13:
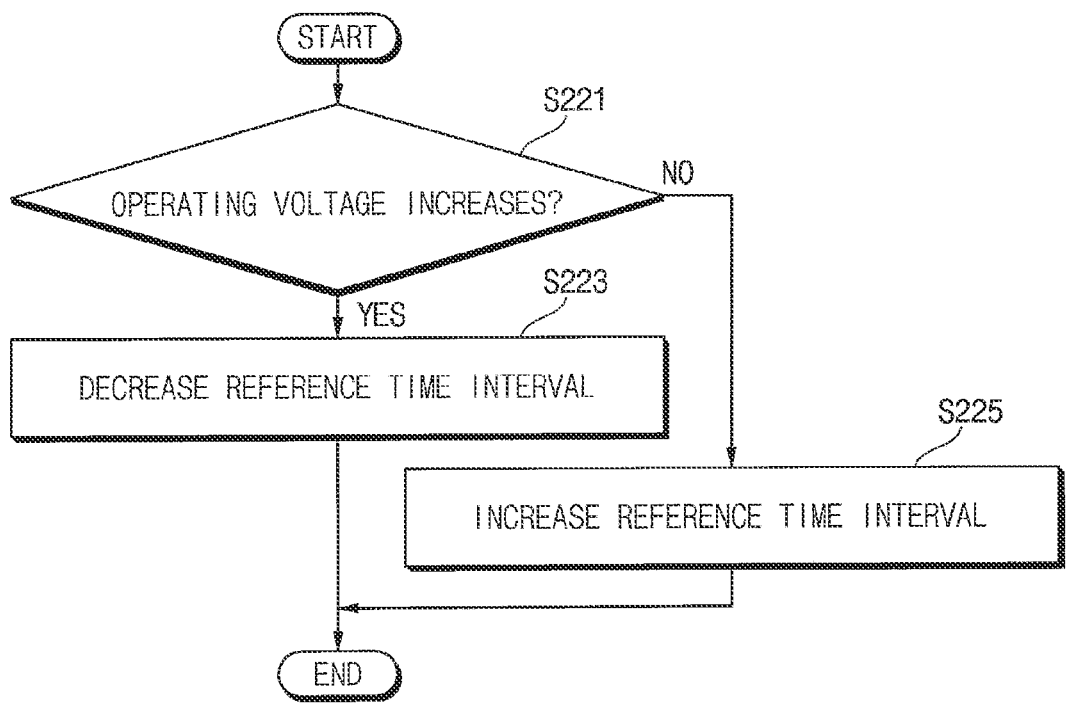
FIG. 13 is a flowchart for describing an operation of FIG. 12.

FIG. 12 is a flowchart illustrating another example of adjusting a reference time interval in FIG. 1. FIG. 13 is a flowchart for describing an operation of FIG. 12.

Referring to FIGS. 1 and 12, when adjusting the reference time interval (step S200), the reference time interval may be set based on an operating voltage of the memory device (step S220). For example, step S220 may be performed by the reference time interval control circuit 320 and the process, voltage and temperature table 322 in FIGS. 3 and 4. For example, step S220 may be performed based on the second table 322b of FIG. 7.

Referring to FIGS. 12 and 13, when setting the reference time interval based on the operating voltage of the memory device (step S220), when the operating voltage of the memory device increases (step S221: YES), the reference time interval may decrease (step S223). When the operating voltage of the memory device decreases (step S221: NO), the reference time interval may increase (step S225).

Figure 14:
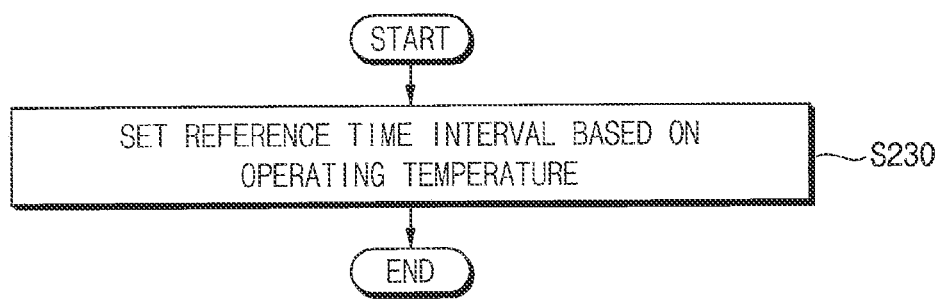
FIG. 14 is a flowchart illustrating still another example of adjusting a reference time interval in FIG. 1.
Figure 15:
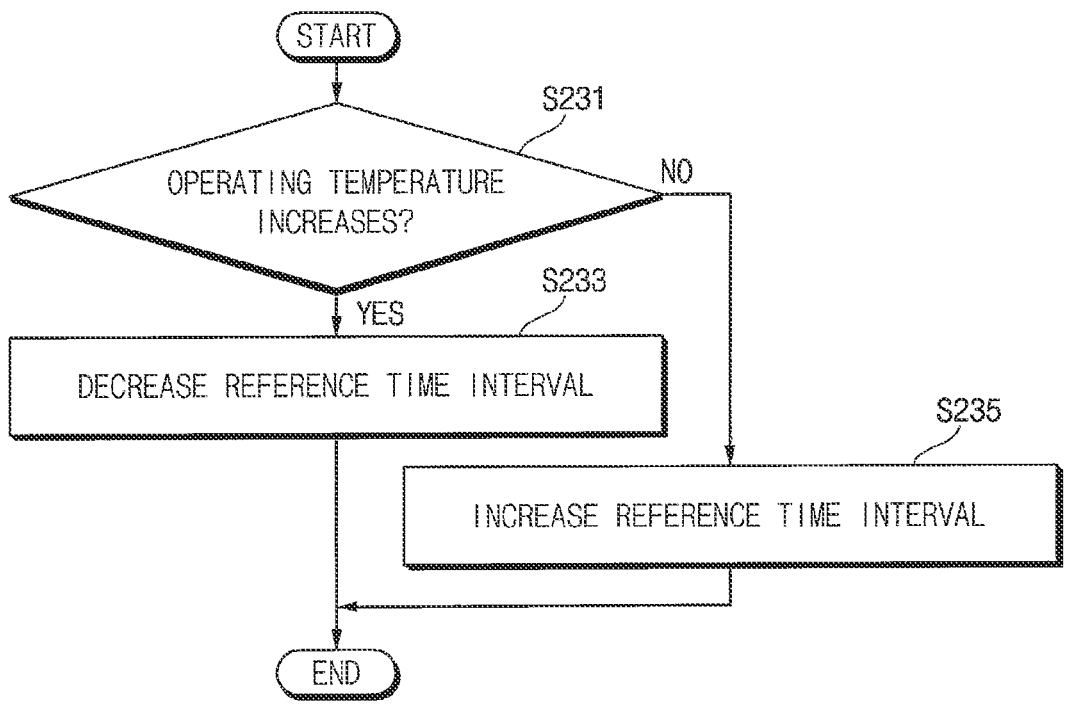
FIG. 15 is a flowchart for describing an operation of FIG. 14.

FIG. 14 is a flowchart illustrating still another example of adjusting a reference time interval in FIG. 1. FIG. 15 is a flowchart for describing an operation of FIG. 14.

Referring to FIGS. 1 and 14, when adjusting the reference time interval (step S200), the reference time interval may be set based on an operating temperature of the memory device (step S230). For example, step S230 may be performed by the reference time interval control circuit 320 and the process, voltage and temperature table 322 in FIGS. 3 and 4. For example, step S230 may be performed based on the third table 322c of FIG. 8.

Referring to FIGS. 14 and 15, when setting the reference time interval based on the operating temperature of the memory device (step S230), when the operating temperature of the memory device increases (step S231: YES), the reference time interval may decrease (step S233). When the operating temperature of the memory device decreases (step S231: NO), the reference time interval may increase (step S235).

In some exemplary embodiments, step S200 may include only one of steps S210, S220 and S230. In other exemplary embodiments, step S200 may include two or all of steps S210, S220 and S230.

Figure 16:
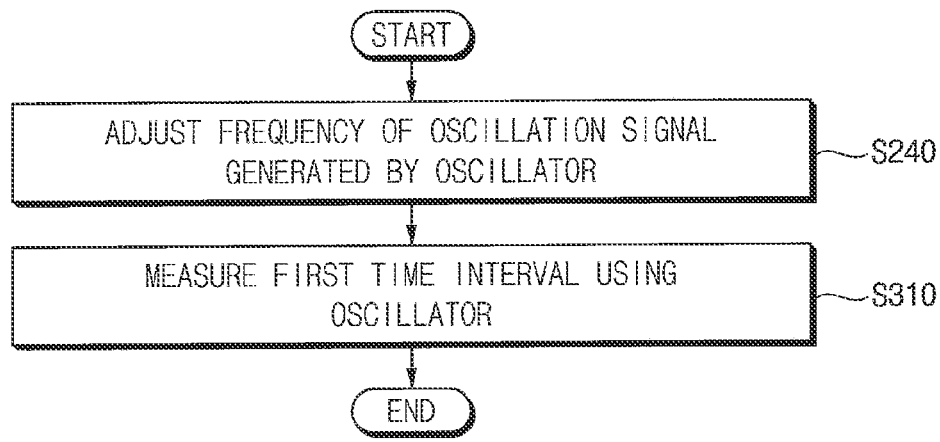
FIG. 16 is a flowchart illustrating examples of adjusting a reference time interval and internally measuring a first time interval in FIG. 1.

FIG. 16 is a flowchart illustrating examples of adjusting a reference time interval and internally measuring a first time interval in FIG. 1.

Referring to FIGS. 1 and 16, when adjusting the reference time interval (step S200), a frequency of an oscillation signal that is generated by an oscillator included in the memory device may be adjusted (step S240). For example, step S240 may be performed by the timer 310 and the reference time interval control circuit 320 in FIGS. 3 and 4. For example, step S240 may be performed by the oscillator 312 of FIG. 5.

When internally measuring the first time interval (step S300), the first time interval may be measured using the oscillator, e.g., using the oscillation signal generated from the oscillator (step S310). For example, step S310 may be performed by the timer 310 in FIGS. 3 and 4. For example, step S310 may be performed by the oscillator 312 of FIG. 5.

Figure 17:
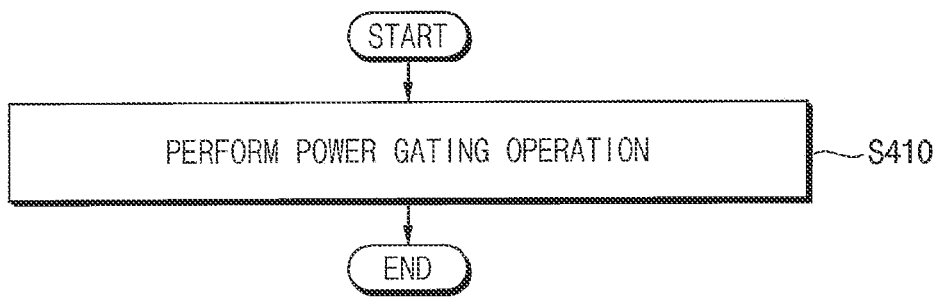
FIG. 17 is a flowchart illustrating an example of performing a power control operation in FIG. 1.
Figure 18:
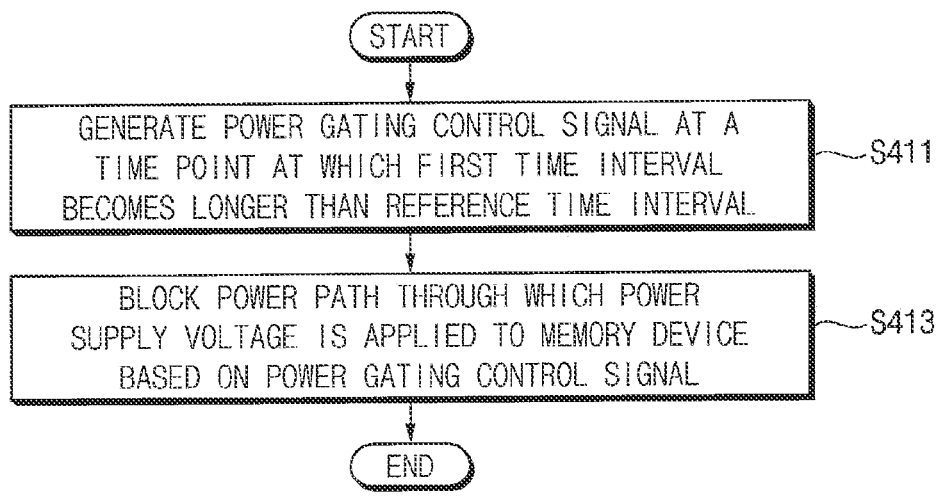
FIG. 18 is a flowchart for describing an operation of FIG. 17.

FIG. 17 is a flowchart illustrating an example of performing the power control operation in FIG. 1. FIG. 18 is a flowchart for describing an operation of FIG. 17.

Referring to FIGS. 1 and 17, when performing the power control operation (step S400), a power gating operation to block a power supply voltage applied to the memory device may be performed (step S410). For example, step S410 may be performed by the power control circuit 330 in FIGS. 3 and 4. For example, step S410 may be performed by the power gating control circuit 332 and the power gating circuit 334 in FIGS. 9 and 10.

Referring to FIGS. 17 and 18, when performing the power gating operation (step S410), a power gating control signal may be generated at a time point at which the first time interval becomes longer than the reference time interval (step S411). A power path through which the power supply voltage is applied to the memory device may be blocked based on the power gating control signal (step S413).

Figure 19:
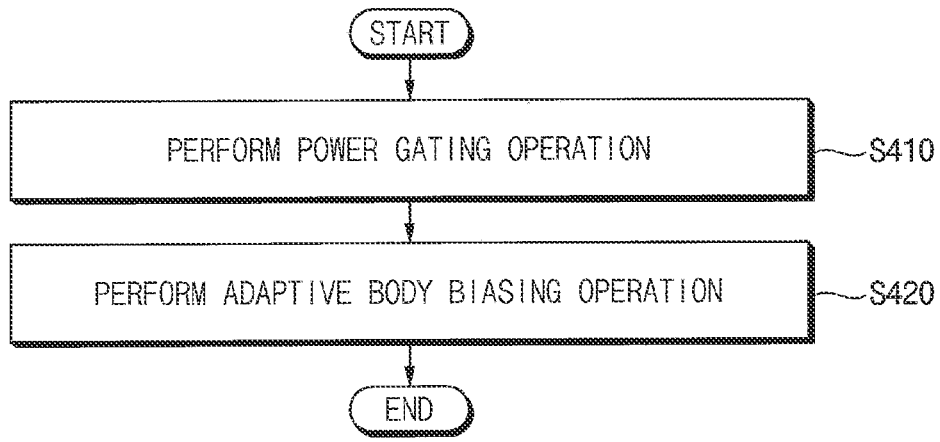
FIG. 19 is a flowchart illustrating another example of performing a power control operation in FIG. 1.
Figure 20:
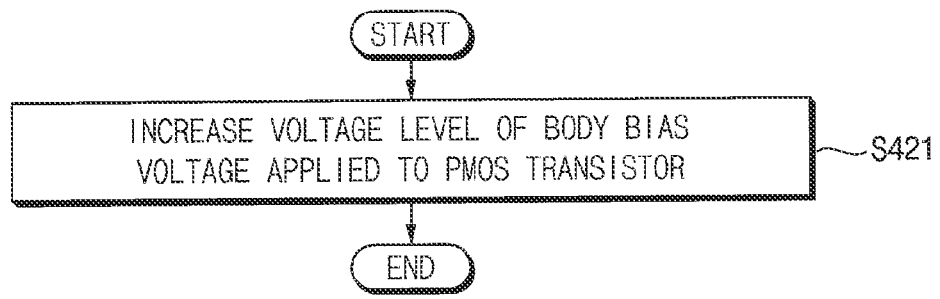
FIGS. 20 and 21 are flowcharts for describing an operation of FIG. 19.
Figure 21:
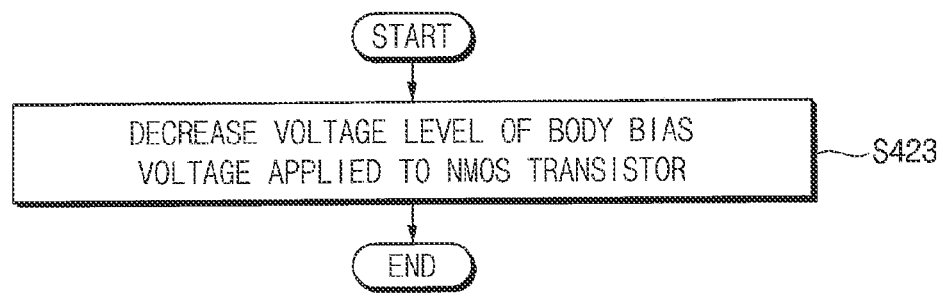

FIG. 19 is a flowchart illustrating another example of performing a power control operation in FIG. 1. FIGS. 20 and 21 are flowcharts for describing an operation of FIG. 19. Descriptions repeated with respect to FIG. 17 will be omitted as redundant.

Referring to FIGS. 1 and 19, when performing the power control operation (step S400), step S410 may be substantially the same as step S410 in FIG. 17.

An adaptive body biasing operation to adjust at least one body bias voltage applied to at least one transistor included in the memory device may be performed (step S420). For example, the at least one body bias voltage may be changed to increase a threshold voltage of the at least one transistor. For example, step S420 may be performed by the power control circuit 330 in FIGS. 3 and 4. For example, step S420 may be performed by the adaptive body biasing control circuit 336 in FIG. 10.

Referring to FIGS. 19 and 20, when performing the adaptive body biasing operation (step S420), a voltage level of a first body bias voltage applied to a PMOS transistor included in the memory device may increase (step S421).

Referring to FIGS. 19 and 21, when performing the adaptive body biasing operation (step S420), a voltage level of a second body bias voltage applied to an NMOS transistor included in the memory device may decrease (step S423).

In some exemplary embodiments, step S420 may include only one of steps S421 and S423. In other exemplary embodiments, step S420 may include both steps S421 and S423.

Figure 22:
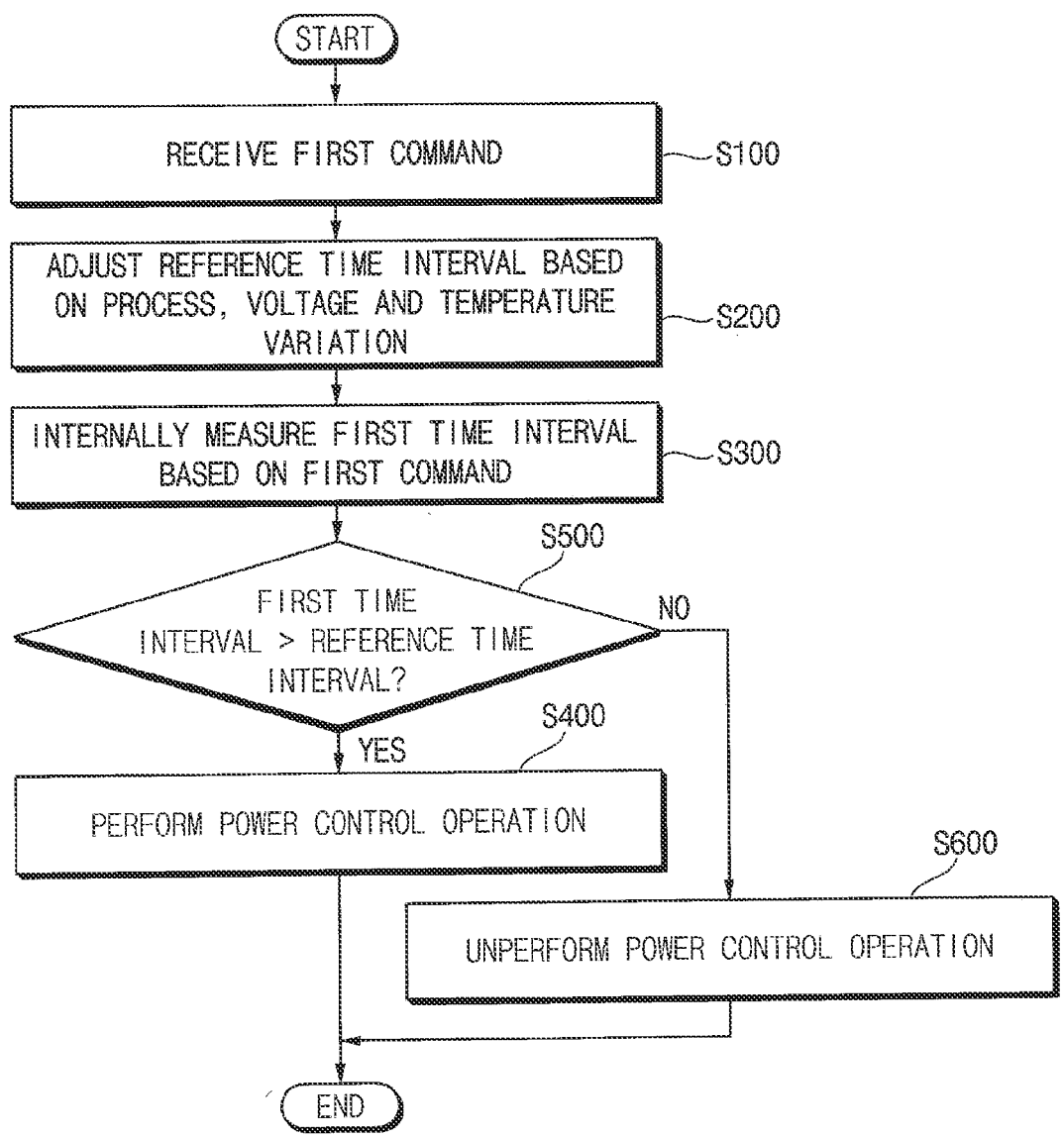
FIGS. 22 and 23 are flowcharts illustrating a method of operating a memory device according to exemplary embodiments.
Figure 23:
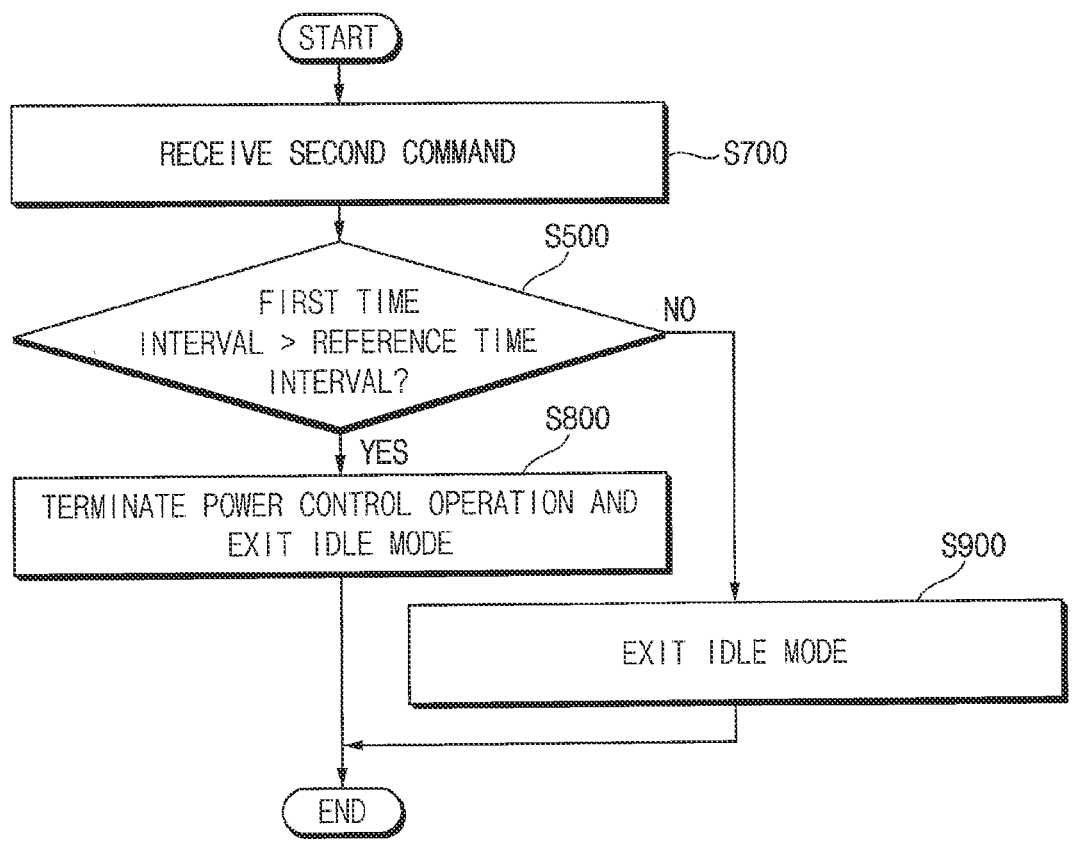

FIGS. 22 and 23 are flowcharts illustrating a method of operating a memory device according to exemplary embodiments. Descriptions repeated with respect to FIG. 1 will be omitted as redundant.

Referring to FIGS. 2 and 22, in a method of operating a memory device according to exemplary embodiments, steps S100, S200 and S300 may be substantially the same as steps S100, S200 and S300 in FIG. 1, respectively.

When the first time interval is longer than the reference time interval (step S500: YES), the power control operation 140 for reducing the power consumption of the memory device is performed (step S400). Step S400 may be substantially the same as step S400 in FIG. 1.

When the first time interval is shorter than or equal to the reference time interval (step S500: NO), the power control operation 140 is not performed (step S600). For example, as will be described with reference to FIG. 23, a condition or environment in which the first time interval is shorter than or equal to the reference time interval may mean that the idle mode 120 has terminated before the reference time interval has elapsed from the first time point, and thus the memory device may exit the idle mode 120 without performing the power control operation 140.

Referring to FIGS. 2 and 23, in a method of operating a memory device according to exemplary embodiments, while the memory device operates in the idle mode 120, the memory device receives the second command CMDX to allow the memory device to exit the idle mode 120 (step S700). For example, the second command CMDX may include one of a power down mode exit command, a sleep mode exit command, a deep sleep mode exit command and a refresh mode exit command.

Step S500 may be substantially the same as step S500 in FIG. 22. For example, the first time interval, which is a time interval between the first time point at which the first command CMDE is received and a third time point at which the second command CMDX is received, may be compared with the reference time interval.

When the first time interval is longer than the reference time interval (step S500: YES), the power control operation 140 is terminated and the memory device exits the idle mode 120 (step S800). Steps S700 and S800 may be performed after steps S400 in FIGS. 1 and 22, e.g., after the power control operation 140 starts.

When the first time interval is shorter than or equal to the reference time interval (step S500: NO), the power control operation 140 is not performed as described with reference to FIGS. 1 and 22, and the memory device exits the idle mode 120 (step S900). Steps S700 and S900 may be performed after step S600 in FIG. 22, e.g., when the power control operation 140 is not started.

Figure 24:
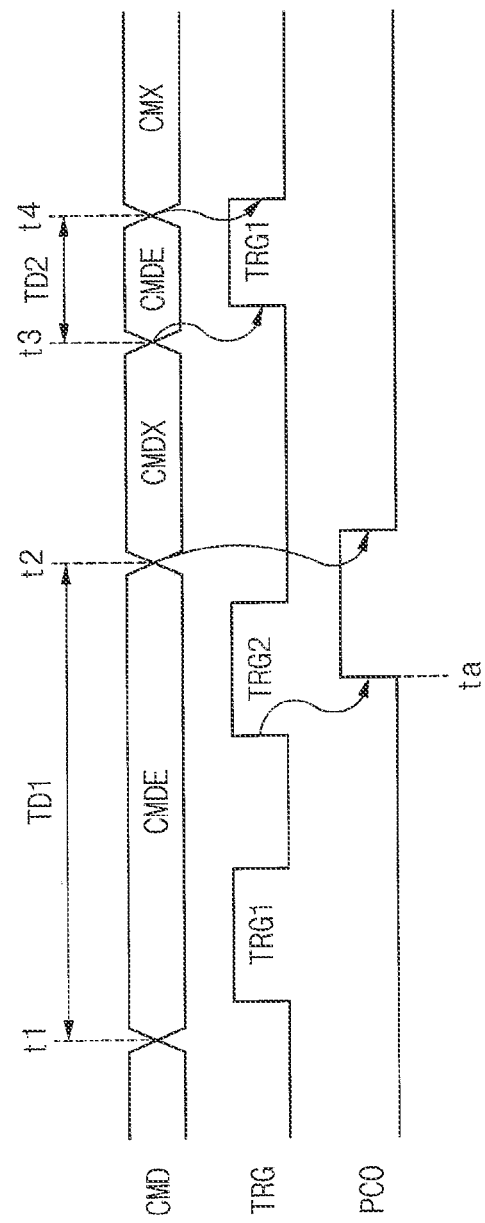
FIG. 24 is a diagram for describing a method of operating a memory device according to exemplary embodiments.

FIG. 24 is a diagram for describing a method of operating a memory device according to exemplary embodiments.

Referring to FIG. 24, CMD represents a command received by the command decoder 211, TRG represents a trigger signal associated with the time measurement operation 130 and the power control operation 140, and PCO represents whether the power control operation 140 is performed.

At a time point t1, the memory device may receive the first command CMDE, and the memory device may enter the idle mode 120 based on the first command CMDE. In addition, a first trigger signal TRG1 for starting the time measurement operation 130 may be generated, and the operation of internally measuring the first time interval may be performed based on the first trigger signal TRG1.

When the first time interval becomes longer than the reference time interval, a second trigger signal TRG2 for starting the power control operation 140 may be generated, and at a time point ta, the power control operation 140 may be performed based on the second trigger signal TRG2.

After that, at a time point t2, the memory device may receive the second command CMDX, and the power control operation 140 may be terminated and the memory device may exit the idle mode 120 based on the second command CMDX. An operation at the time point t2 may correspond to steps S700 and S800 in FIG. 23.

After that, at a time point t3, the memory device may receive the first command CMDE again, and the memory device may enter the idle mode 120 again based on the first command CMDE. In addition, the first trigger signal TRG1 for starting the time measurement operation 130 may be generated again, and the operation of internally measuring the first time interval may be performed again based on the first trigger signal TRG1.

After that, at a time point t4, the memory device may receive the second command CMDX before the first time interval becomes longer than the reference time interval, and the memory device may exit the idle mode 120 based on the second command CMDX. In this case, the power control operation 140 may not be performed. An operation at the time point t4 may correspond to step S600 in FIG. 22 and steps S700 and S900 in FIG. 23.

When the time interval (e.g., a time interval TD1 from the time point t1 to the time point t2) during which the idle mode 120 is maintained is longer than the reference time interval, the power control operation 140 may be performed. When the time interval (e.g., a time interval TD2 from the time point t3 to the time point t4) during which the idle mode 120 is maintained is shorter than or equal to the reference time interval, the power control operation 140 may not be performed.

As will be appreciated by those skilled in the art, the inventive concept may be embodied as a system, method, computer program product, and/or a computer program product embodied in one or more computer readable medium(s) having computer readable program code embodied thereon. The computer readable program code may be provided to a processor of a general purpose computer, special purpose computer, or other programmable data processing apparatus. The computer readable medium may be a computer readable signal medium or a computer readable storage medium. The computer readable storage medium may be any tangible medium that can contain or store a program for use by or in connection with an instruction execution system, apparatus, or device. For example, the computer readable medium may be a non-transitory computer readable medium.

FIG. 25 is a block diagram illustrating a memory system including a memory device according to exemplary embodiments.

Referring to FIG. 25, a memory system 500 may include a memory controller 600 and at least one memory device 700.

The memory device 700 may correspond to the memory device according to exemplary embodiments described with reference to FIGS. 3 through 10, may perform the method of operating the memory device according to exemplary embodiments described with reference to FIGS. 1, 2, 11 through 24, and may perform data write and/or read operations under control of the memory controller 600. The memory device 700 may receive a command CMD and an address ADDR through I/O lines from the memory controller 600 for performing such operations, and may exchange data DAT through data I/O lines with the memory controller 600 for performing such operations. In addition, the memory device 700 may receive a control signal CTRL through control lines from the memory controller 600. Moreover, the memory device 700 receives power PWR through a power line from the memory controller 600. For example, at least a part or all of the I/O lines, the data I/O lines and the control lines may be referred to as a channel.

For example, the control signal CONT may include a chip enable signal (/CE), a write enable signal (/WE), a read enable signal (/RE), a command latch enable signal (CLE), an address latch enable signal (ALE), or the like. Although not illustrated in FIG. 25, the memory device 700 may transmit/receive a data strobe signal (e.g., a DQS signal) to/from the memory controller 600. The DQS signal may be a signal used to provide a reference time point for determining a logic value of the data DAT exchanged between the memory controller 600 and the memory device 700.

Figure 26:
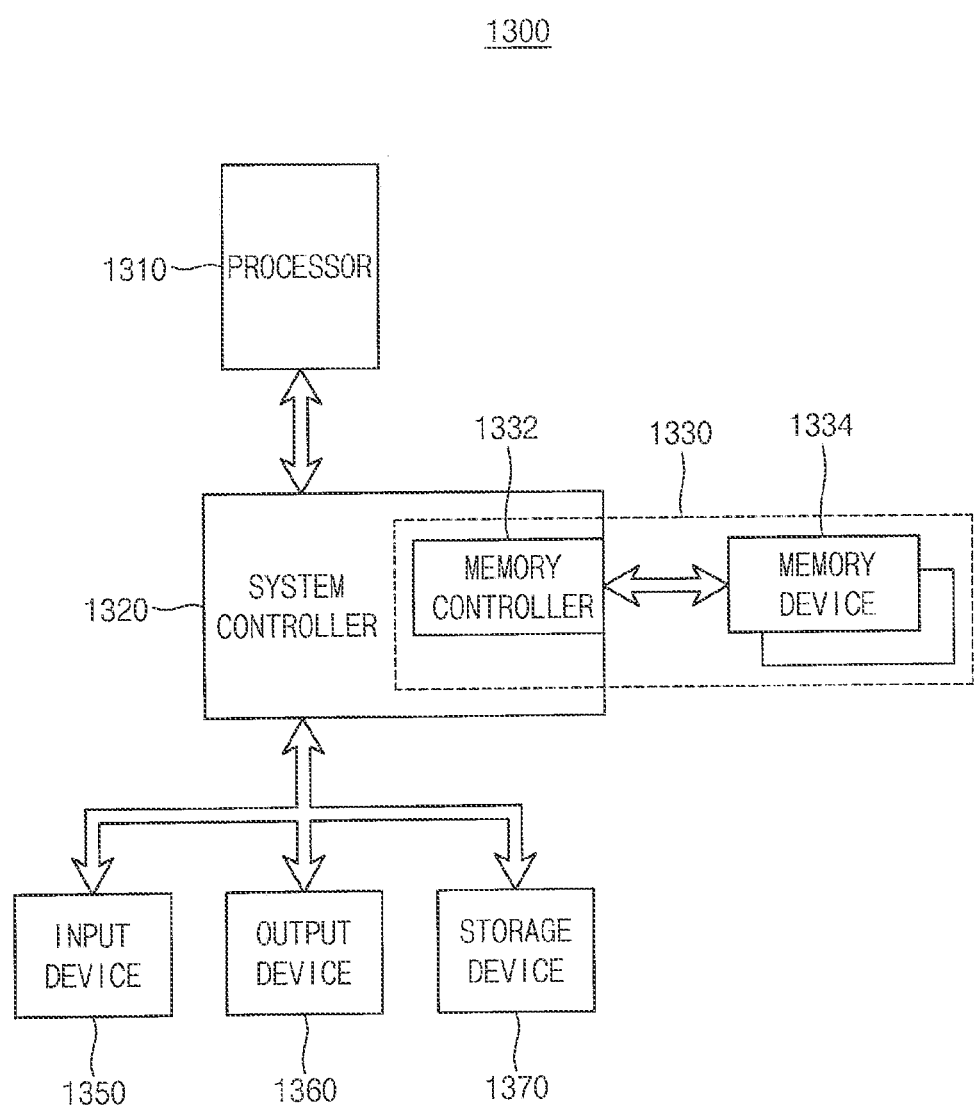
FIG. 26 is a block diagram illustrating a computing system including a memory device according to exemplary embodiments.

FIG. 26 is a block diagram illustrating a computing system including a memory device according to exemplary embodiments.

Referring to FIG. 26, a computing system 1300 may include a processor 1310, a system controller 1320 and a memory system 1330. The computing system 1300 may further include an input device 1350, an output device 1360 and a storage device 1370.

The memory system 1330 may include a plurality of memory devices 1334, and a memory controller 1332 for controlling the memory devices 1334. The memory controller 1332 may be included in the system controller 1320. The memory devices 1334, the memory controller 1332 and the memory system 1330 may operate based on the methods according to exemplary embodiments.

The processor 1310 may perform various computing functions, such as executing specific software instructions for performing specific calculations or tasks. The processor 1310 may be connected to the system controller 1320 via a processor bus. The system controller 1320 may be connected to the input device 1350, the output device 1360 and the storage device 1370 via an expansion bus. As such, the processor 1310 may control the input device 1350, the output device 1360 and the storage device 1370 using the system controller 1320.

The inventive concept may be applied to various electronic devices and systems that include semiconductor memory devices (e.g., volatile memory devices). For example, the inventive concept may be applied to systems such as a personal computer (PC), a server computer, a data center, a workstation, a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, etc.

The foregoing is illustrative of exemplary embodiments and is not to be construed as limiting thereof. Although some exemplary embodiments have been described, those skilled in the art will readily appreciate that many modifications are possible in such exemplary embodiments without materially departing from the novel teachings and advantages of the exemplary embodiments. Accordingly, all such modifications are intended to be included within the scope of the exemplary embodiments as defined in the claims. Therefore, it is to be understood that the foregoing is illustrative of various exemplary embodiments and is not to be construed as limited to the specific exemplary embodiments disclosed, and that modifications to the disclosed exemplary embodiments, as well as other exemplary embodiments, are intended to be included within the scope of the appended claims.

What is claimed is:

1. A method of operating a memory device, the method comprising:
   receiving a first command to allow the memory device to enter an idle mode;
   adjusting a reference time interval based on process, voltage and temperature (PVT) variation associated with the memory device, the reference time interval being used to determine a start time point of a power control operation for reducing power consumption of the memory device;
   internally measuring a first time interval during which the idle mode is maintained based on the first command; and
   performing the power control operation in response to the first time interval being longer than the reference time interval, wherein
   adjusting the reference time interval includes setting the reference time interval based on characteristics of a plurality of transistors included in the memory device, the characteristics of the plurality of transistors being determined when the memory device is manufactured.

2. The method of claim 1, wherein adjusting the reference time interval includes setting the reference time interval based on an operating voltage of the memory device.

3. The method of claim 2, wherein setting the reference time interval based on the operating voltage of the memory device includes:
   decreasing the reference time interval as the operating voltage of the memory device increases; and
   increasing the reference time interval as the operating voltage of the memory device decreases.

4. The method of claim 1, wherein adjusting the reference time interval includes setting the reference time interval based on an operating temperature of the memory device.

5. The method of claim 4, wherein setting the reference time interval based on the operating temperature of the memory device includes:
   decreasing the reference time interval as the operating temperature of the memory device increases; and
   increasing the reference time interval as the operating temperature of the memory device decreases.

6. The method of claim 1, wherein performing the power control operation includes performing a power gating operation to block a power supply voltage applied to the memory device.

7. The method of claim 6, wherein performing the power gating operation includes:
   generating a power gating control signal at a first time point at which the first time interval becomes longer than the reference time interval; and
   blocking a power path through which the power supply voltage is applied to the memory device based on the power gating control signal.

8. The method of claim 6, wherein performing the power control operation further includes performing an adaptive body biasing operation to adjust at least one body bias voltage applied to at least one transistor included in the memory device.

9. The method of claim 8, wherein the at least one body bias voltage is changed to increase a threshold voltage of the at least one transistor.

10. The method of claim 8, wherein:
    the at least one transistor includes a p-type metal oxide semiconductor (PMOS) transistor,
    the at least one body bias voltage includes a first body bias voltage applied to the PMOS transistor, and
    performing the adaptive body biasing operation includes increasing a voltage level of the first body bias voltage.

11. The method of claim 8, wherein:
    the at least one transistor includes an n-type metal oxide semiconductor (NMOS) transistor,
    the at least one body bias voltage includes a second body bias voltage applied to the NMOS transistor, and
    performing the adaptive body biasing operation includes decreasing a voltage level of the second body bias voltage.

12. The method of claim 1, wherein:
    the memory device includes an oscillator configured to generate an oscillation signal, and
    an operation of internally measuring the first time interval is performed using the oscillator.

13. The method of claim 12, wherein an operation of adjusting the reference time interval is performed by adjusting a frequency of the oscillation signal.

14. A memory device comprising:
    a command decoder configured to receive a first command to allow the memory device to enter an idle mode;
    a timer configured to internally measure a first time interval during which the idle mode is maintained based on the first command;
    a reference time interval control circuit configured to adjust a reference time interval based on process, voltage and temperature (PVT) variation associated with the memory device, the reference time interval being used to determine a start time point of a power control operation for reducing power consumption of the memory device, wherein the reference time interval control circuit includes:
       a first table used to set the reference time interval based on characteristics of a plurality of transistors included in the memory device, the characteristics of the plurality of transistors being determined when the memory device is manufactured,
       a second table used to set the reference time interval based on an operating voltage of the memory device, and
       a third table used to set the reference time interval based on an operating temperature of the memory device;
    a power control circuit configured to perform the power control operation in response to the first time interval being longer than the reference time interval; and
    a logic block of which power consumption is reduced by the power control operation.

15. The memory device of claim 14, wherein the power control circuit includes:
    a power gating control circuit configured to generate a power gating control signal at a first time point at which the first time interval becomes longer than the reference time interval; and
    a power gating circuit configured to block a power path through which a power supply voltage is applied to the memory device based on the power gating control signal.

16. The memory device of claim 15, wherein the power control circuit further includes an adaptive body biasing control circuit configured to increase a voltage level of a first body bias voltage applied to a p-type metal oxide semiconductor (PMOS) transistor included in the memory device or to decrease a voltage level of a second body bias voltage applied to an n-type metal oxide semiconductor (NMOS) transistor included in the memory device, based on the power gating control signal.

17. The memory device of claim 14, wherein:
the timer includes an oscillator configured to generate an oscillation signal,
an operation of internally measuring the first time interval is performed using the oscillator, and
an operation of adjusting the reference time interval is performed by adjusting a frequency of the oscillation signal.

18. A method of operating a memory device, the method comprising:
receiving a first command to allow the memory device to enter an idle mode and generating a power control enable signal based on the first command;
adjusting a reference time interval based on process, voltage and temperature (PVT) variation associated with the memory device, the reference time interval being used to determine a start time point of a power control operation for reducing power consumption of the memory device;
internally measuring, using a timer that is activated based on the power control enable signal, a first time interval during which the idle mode is maintained;
performing, using a power control circuit that is activated based on the power control enable signal, the power control operation in response to the first time interval being longer than the reference time interval;

in response to the memory device receiving a second command to allow the memory device to exit the idle mode after the power control operation is performed, terminating the power control operation and exiting the idle mode; and
in response to the memory device receiving the second command before the first time interval becomes longer than the reference time interval, exiting the idle mode without performing the power control operation, wherein:
adjusting the reference time interval includes:
setting the reference time interval based on characteristics of a plurality of transistors included in the memory device, the characteristics of the plurality of transistors being determined when the memory device is manufactured;
setting the reference time interval based on an operating voltage of the memory device; and
setting the reference time interval based on an operating temperature of the memory device, and
performing the power control operation includes:
performing a power gating operation to block a power supply voltage applied to the memory device; and
performing an adaptive body biasing operation to adjust at least one body bias voltage applied to the plurality of transistors.

* * * * *